United States Patent
Clifford et al.

[11] Patent Number: 6,116,230
[45] Date of Patent: Sep. 12, 2000

[54] MICROPROCESSOR-CONTROLLED GAS APPLIANCE UTILIZING A SINGLE ELECTRODE SPARK IGNITION SYSTEM AND A PULSE WIDTH MODULATED PROPORTIONAL VALVE

[75] Inventors: Todd W. Clifford, Loveland, Ohio; Jeffrey A. Benz, Covington, Ky.; Michael T. Mills, Cincinnati, Ohio

[73] Assignee: Convenience Technologies, Inc., Loveland, Ohio

[21] Appl. No.: 09/109,797

[22] Filed: Jul. 2, 1998

Related U.S. Application Data

[63] Continuation-in-part of application No. 08/591,398, Jan. 25, 1996, Pat. No. 5,813,394, which is a continuation-in-part of application No. 08/283,992, Aug. 1, 1994, Pat. No. 5,617, 840, which is a continuation-in-part of application No. 07/856,347, Mar. 23, 1992, Pat. No. 5,333,596.

[51] Int. Cl.[7] .................................................... F24C 3/00
[52] U.S. Cl. ............................... 126/39 BA; 251/129.05; 251/129.08
[58] Field of Search ............................. 126/39 R, 39 BA, 126/116 A; 431/62; 251/129.05, 129.08

[56] References Cited

U.S. PATENT DOCUMENTS

| | | | |
|---|---|---|---|
| 3,289,801 | 12/1966 | Jerkins | 194/3 |
| 3,292,821 | 12/1966 | Cowley | 222/2 |
| 3,300,092 | 1/1967 | Williams | 222/70 |
| 3,469,590 | 9/1969 | Barker | 251/129.08 |
| 3,630,189 | 12/1971 | Hodges et al. | 126/41 R |
| 4,288,209 | 9/1981 | Yoshinaga | 431/255 |
| 4,805,587 | 2/1989 | Schweitzer | 126/39 L |
| 5,003,960 | 4/1991 | Hanagan | 126/39 BA |
| 5,033,449 | 7/1991 | Hanagan | 126/39 BA |
| 5,044,520 | 9/1991 | Moisan | 222/2 |
| 5,052,174 | 10/1991 | Bak | 251/129.05 |
| 5,163,358 | 11/1992 | Hanagan et al. | 99/339 |
| 5,333,596 | 8/1994 | Clifford | 126/41 R |
| 5,388,984 | 2/1995 | Meslif | 251/129.05 |
| 5,544,856 | 8/1996 | King et al. | 251/129.08 |
| 5,590,642 | 1/1997 | Borgeson et al. | 126/116 A |
| 5,617,840 | 4/1997 | Clifford . | |
| 5,813,394 | 9/1998 | Clifford . | |

FOREIGN PATENT DOCUMENTS

| | | |
|---|---|---|
| 800040 | 10/1997 | European Pat. Off. . |
| 213740 | 10/1985 | Japan . |
| 2 099 607 | 12/1982 | United Kingdom . |
| 2 109 603 | 6/1983 | United Kingdom . |

*Primary Examiner*—Ira S. Lazarus
*Assistant Examiner*—Sara Clarke
*Attorney, Agent, or Firm*—Wood, Herron & Evans, L.L.P.

[57] ABSTRACT

The present invention is a gas appliance comprising a burner, a conduit, a control circuit, and a valve. The burner is adapted to burn a fuel and producing a flame. The conduit is connected to a source of the fuel and adapted to convey the fuel to a burner. The valve is interposed on the conduit between the source of fuel and the burner and is in electrical communication with the control circuit. The control circuit is adapted to provide a pulse width modulated signal to the valve whereby the valve provides a substantially linear flow rate of fuel to the burner.

16 Claims, 4 Drawing Sheets

MICROPROCESSOR-CONTROLLED GAS APPLIANCE UTILIZING A SINGLE ELECTRODE SPARK IGNITION SYSTEM AND A PULSE WIDTH MODULATED PROPORTIONAL VALVE

This application is a Continuation-In-Part of U.S. Ser. No. 08/591,398, filed on Jan. 25, 1996, now U.S. Pat. No. 5,813,394; which is a Continuation-In-Part of U.S. Ser. No. 08/283,992, filed on Aug. 1, 1994, now U.S. Pat. No. 5,617,840; which is a Continuation-In-Part of U.S. Ser. No. 07/856,347, filed on Mar. 23, 1992, now U.S. Pat. No. 5,333,596.

BACKGROUND AND SUMMARY OF THE INVENTION

The present invention relates generally to systems for igniting fuel and, more particularly, to a single electrode spark ignition system for igniting fuel and to a system for controlling the gas flow to a burner using a pulse width modulated proportional valve. The present invention will be described primarily with regard to fuel-connected cooking appliances having electronic control circuitry. However, the present invention may be used in connection with virtually any apparatus or appliance which may need spark ignition or proportional gas flow control.

Gas cooking appliances have not extensively used microprocessor based electronic controls to control surface burners for two reasons: 1) the transient electrical pulses or voltage spikes from known single probe spark ignition systems may undesirably interfere with electronic circuits; and 2) a proportional valve may be needed which is adapted to precisely and cost effectively control the amount of gas in small incremental changes on a repeatable basis.

Fuel-connected cooking appliances may comprise a spark ignition system to ignite fuel at a burner. In known single electrode spark ignition systems for cooking appliances, fuel emanates from a burner which is grounded to the chassis of the cooking appliance. The chassis, however, may not be properly grounded. For example, the chassis of a cooking appliance may be resting on nonconductive plastic or rubber wheels, or the chassis may be resting on a nonconductive surface such as wood. In order to ignite the fuel, a voltage potential difference is generated between an electrode and the burner. The voltage potential difference may be in the range of 12,000 to 20,000 volts. Consequently, a 12,000 to 20,000 volt ignition spark is generated between the electrode and the burner. An ignition spark of this magnitude may cause transient electrical pulses or voltage spikes to undesirably interfere with the performance of electronic circuitry of the cooking appliance. For instance, the transient electrical pulses or voltage spikes may interfere with the performance of a microprocessor-based or microcontroller-based control circuit of a cooking appliance. The transient electrical pulses or voltage spikes may also reset a microprocessor power supply which typically operates at 5 volts. In addition, the transient electrical pulses or voltage spikes may damage components of electronic circuitry, may cause a microprocessor or microcontroller to incorrectly process information, and/or may cause electronic circuitry to lock-up or crash.

Due to the shortcomings of known single electrode spark ignition systems when used in conjunction with electronic circuitry, manufacturers of cooking appliances have instead used dual electrode spark ignition systems or hot surface ignitors to ignite cooking fuel. U.S. Pat. Nos. 5,003,960 and 5,033,449 disclose embodiments of a dual electrode spark ignition system. In a dual electrode spark ignition system, a spark is caused to jump from one electrode to another electrode, rather than from one electrode to chassis ground.

In order to prevent transient electrical pulses or voltage spikes from interfering with electronic circuitry, both electrodes of a dual electrode spark ignition system are heavily isolated from chassis ground and the electronic circuitry. For example, U.S. Pat. Nos. 5,003,960 and 5,033,449 utilize a ceramic insulating material to isolate the electrodes. Nevertheless, water, food, grease, or other conductive materials may gather on the insulating materials and short the electrodes to chassis ground and/or the electronic circuit. In addition, cracks may develop in the insulating material. As a result, water, food, grease, or other conductive materials may enter the cracks and short the electrodes to chassis ground and/or the electronic circuitry.

On the other hand, a hot surface ignitor may not interfere with the functions of a microprocessor or other electronic circuitry. For example, oven controls like those produced by Robertshaw of Long Beach, Calif. and supplied to companies such as the General Electric Company, Louisville, Ky., and the Whirlpool Corporation, Benton Harbor, Mich., utilize hot surface ignitors to avoid the problems presented by spark ignition systems. However, hot surface ignitors like those manufactured by Norton Company, Milton, N.H., may have three significant shortcomings. First of all, the ignitor elements may be made of silicon carbide or other similar fragile materials which may easily break or be damaged during shipment. Secondly, hot surface ignitors may have a high field failure rate due to the ignitor's elements burning out. Lastly, hot surface ignitors may cost approximately seven times more than a single electrode spark ignitor which is adapted for use in gas cooktops and the surface burners of ranges. Using hot surface ignitors, for example, on all four surface burners of gas cooktops or ranges would be too costly and too prone to field failures.

In light of the shortcomings of dual electrode spark ignition systems and hot surface ignitors, a need exists for a more reliable system for igniting fuel. Another need exists for a less costly system for igniting fuel. Still another need exists for a more durable system for igniting fuel. Finally, yet another need exists for a single electrode spark ignition system that does not damage or interfere with the performance of electronic circuitry.

Current range manufacturers use manual valves to control the flow rate of gas to surface burners. With such systems, users may determine the desired flow rate by visually looking at the flame height emanating from the burner and adjusting the manual valve to achieve the desired setting. To achieve desired cooking performance on a consistent basis it is necessary to cook recipes at the same temperature and for the same duration. It may be easier to accomplish cooking at the same temperature repeatedly on electric ranges due to the fact that the knob adjustment provides alphanumeric settings that can easily be remembered and can easily be set. This may not be as easy on known gas ranges because the user may have to estimate and remember how large the flame should be.

The nonlinear flow control of the prior art described in U.S. Pat. No. 4,930,488 requires a sensor to be placed in close proximity to the burner. The sensor provides a feedback loop to the control circuit so that it can alter the current applied to the grooved poppet to modulate the gas flow in response to signals from the sensor. Consequently, the nonlinear flow control system of U.S. Pat. No. 4,930,488 may be subject to irregular heat production, parts failure, associated assembly and inventory costs, and warranty costs.

In light of the shortcomings of the known art, a need exists for a system adapted to provide flow control without the need of a sensor or feedback loop. Another need exists for a flow control system having reduced risk of parts failure and lower assembly costs, inventory costs, and warranty costs. A need also exists for a system adapted to provide a consistent, precise, and repeatable flow of fuel to a burner. Still another need exists for a system whereby a user can precisely control the flow of fuel to a burner. Yet another need exists for a flow control system in which the poppet of a flow control valve reacts linearly in response to a change in the input command. In addition, a need exists to use a pulse width modulated control signal in conjunction with a magnetic field to obtain linear flow control. Finally, a need also exists for a linear flow control system having a timer function and an auto shut off function to enable a user to obtain consistent and repeatable preparation of recipes.

Preferred embodiments of the present invention satisfy some or all of the aforementioned needs. In particular, a preferred embodiment of the present invention is a gas appliance comprising a burner, a conduit, a control circuit, and a valve. The burner is adapted to burn a fuel and produce a flame. The conduit is connected to a source of the fuel and adapted to convey the fuel to the burner. The valve is interposed on the conduit between the source of fuel and the burner and is in electrical communication with the control circuit. The control circuit is adapted to provide a pulse width modulated signal to the valve whereby the valve provides a substantially linear flow rate of fuel to the burner.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

The present invention is directed to a single electrode spark ignition system for igniting fuel and to a system for controlling the gas flow to a burner using a pulse width modulated proportional valve.

Figure 1:
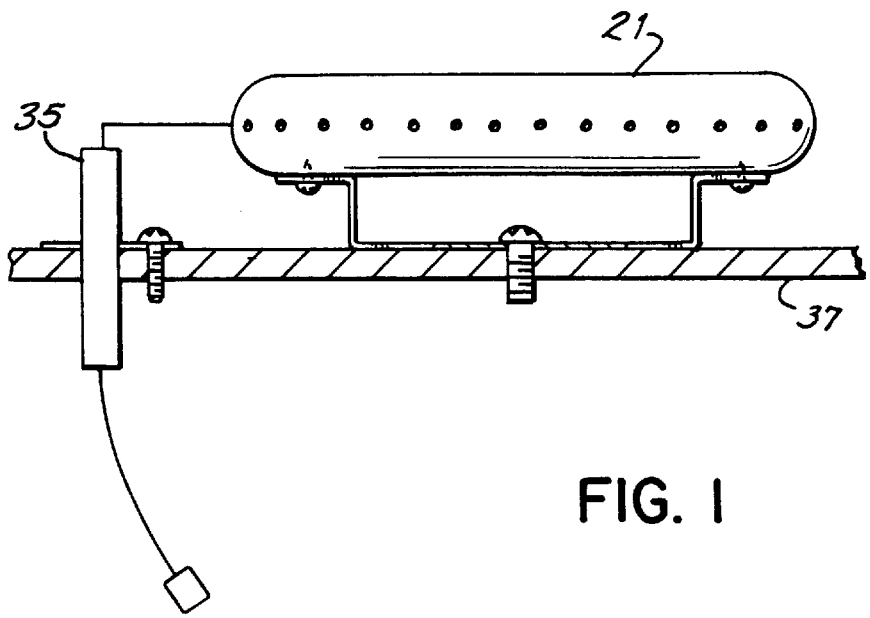
FIG. 1 is a partial cross sectional view of a preferred embodiment of a gas appliance of the present invention in which a single electrode spark ignitor sparks directly to a burner.
Figure 2:
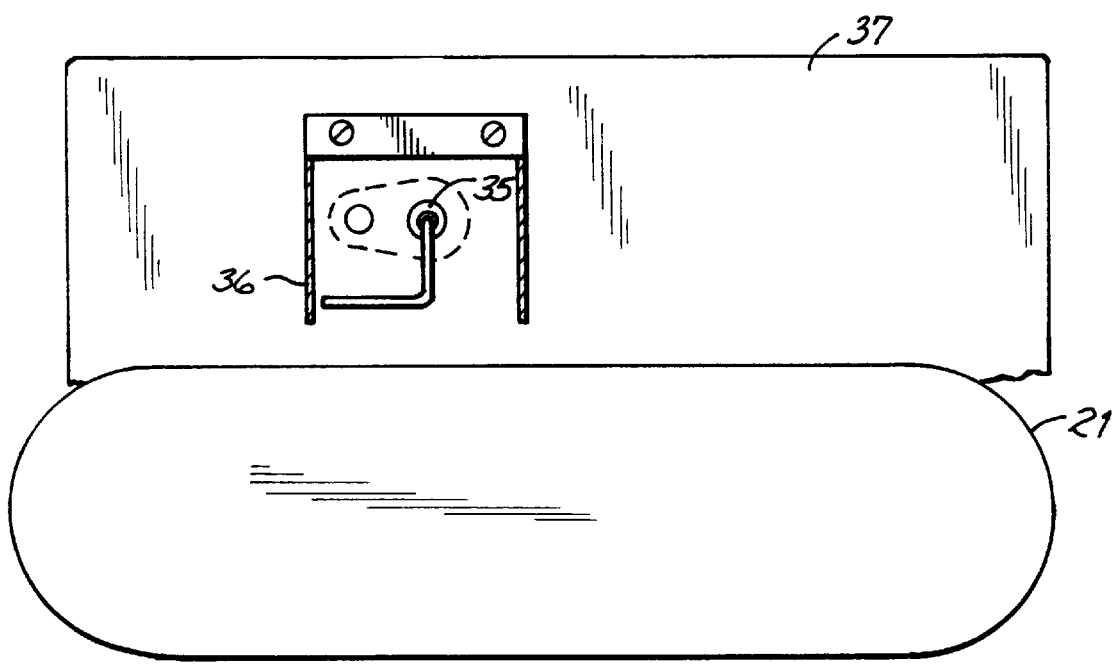
FIG. 2 is a partial top plan view of a preferred embodiment of a gas appliance of the present invention in which a single electrode spark ignitor sparks directly to a metal plate adjacent to a burner.
Figure 3:
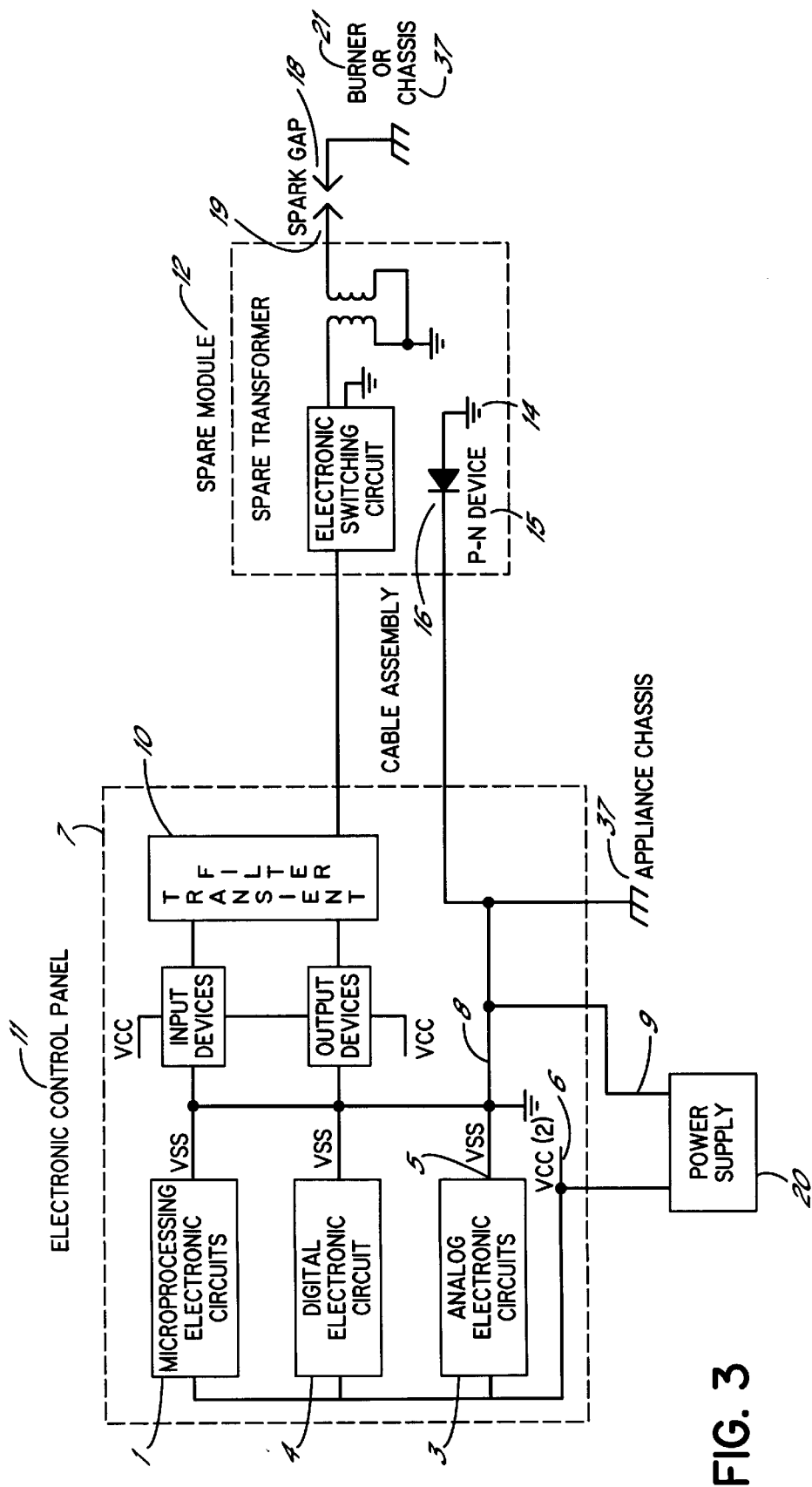
FIG. 3 is a schematic diagram of a preferred embodiment of a single electrode spark ignition system of the present invention.

As seen in FIGS. 1 and 2, during an ignition event a high potential is developed between a single electrode 35 and a burner 21 grounded to the chassis 37 or a metal plate 36 adjacent to the burner which is grounded to the chassis 37 causing a spark to jump either to the burner 21 or to the metal plate 36 adjacent to the burner to ignite fuel emanating from the burner 21.

In regard to a microprocessor 1, microcontroller, analog 3, and/or digital 4 based system, a voltage spike of only 1 volt on a VSS 5 pin will cause either of the four systems to stop operating. In addition, a voltage spike of 600 millivolts above VCC 6 of any input or output ports, may cause an interruption of any of these four types of systems. Consequently, a tempest design must be implemented (tempest is an acronym for transient electromagnetic pulse emanation standard). A tempest design preferably includes input and output filtering of electronic circuits that are susceptible to voltage spikes. Voltage spikes may interfere with normal operation of electronic circuitry and/or may destroy electronic components in electronic circuitry.

The first part of a tempest design is to have a properly designed printed circuit board 7 using proper grounding design techniques. To prevent voltage spikes to be at a VSS 5 pin on an electronic circuit, a VSS 5 pin is connected to a ground plane 8. It is preferred that each VSS 5 pin in the control assembly is connected to the ground plane 8 at a single point. In addition, the VSS 5 pin (ground pin) of each integrated circuit(s) 1, 3, or 4 is preferably connected back to the return 9 of a primary power source or supply 20 through the widest and shortest path on the ground plane 8.

The inputs and outputs of the integrated circuit(s) 1, 3, and/or 4 that are at times at a high impedance state are preferably filtered by a transient suppression filter 10. The filter preferably has a time constant of 5–10 times longer than the rise and fall times of the voltage spikes. This time constant helps to insure the suppression of the voltage spikes. The grounds of the control assembly 11 will be separated from grounds of the high voltage spark module 12. The common ground 8 for the control assembly will not be connected to the common ground 14 of the spark module 12. The common ground 14 of the spark module 12 is isolated from the common ground 8 of the control assembly 11 by a P-N junction device 15 which is connected in a forward biased mode in that the N 16 section of the device is connected to the common ground 8 of the control assembly 11. This raises the common ground 14 of the spark module 12 above the system common ground 8. This design technique preferably allows the single point on the ground plane 8 to still be intact. All of the grounds (common) for the control assembly 11 are preferably connected to chassis ground at this single point. The spark module 12 high voltage output 19 now may spark across a gap to a receptor 18 that is connected to chassis ground 21 near the burner or directly to the burner and mounted to the chassis ground without interrupting or destroying the above mentioned electronic circuits.

Figure 4:
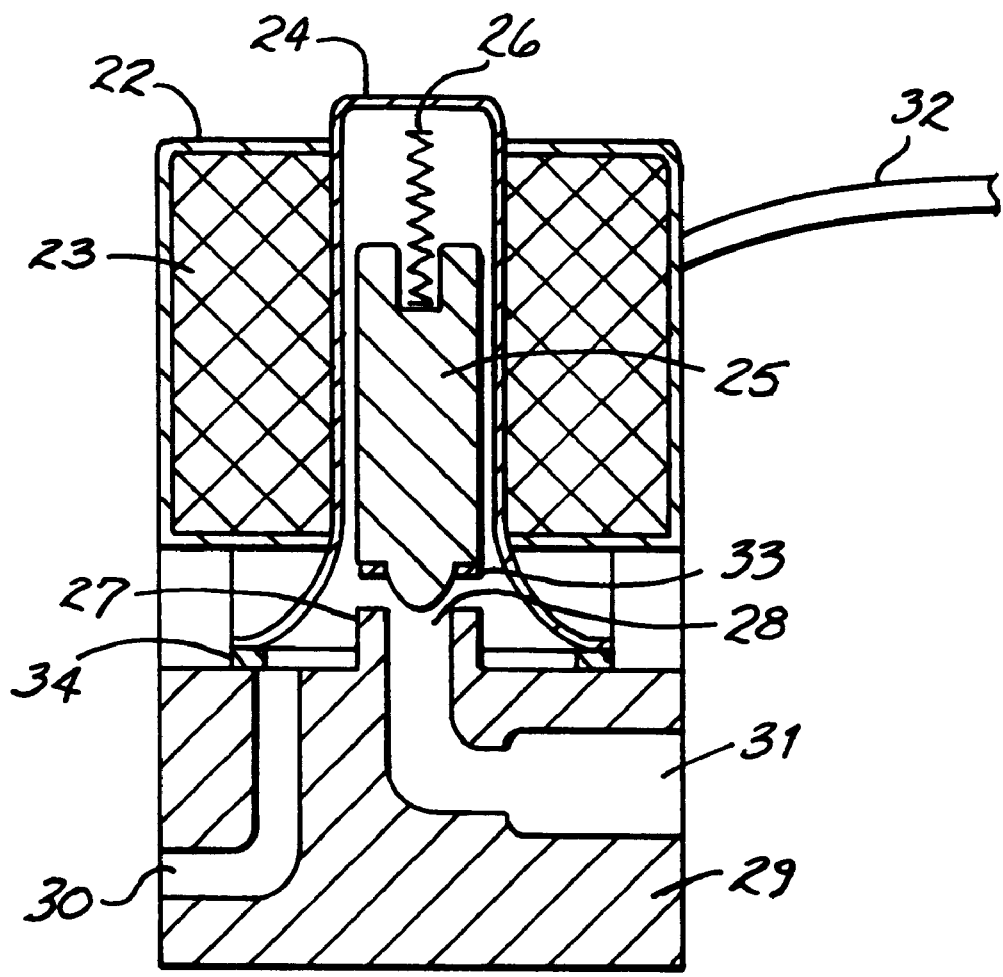
FIG. 4 is a cross sectional view of a preferred embodiment of a proportional valve of the present invention.

FIG. 4 illustrates the preferred embodiment of a proportional valve suitable for use in the present invention. The valve is similar in design to a conventional solenoid valve in that it has a coil housing 22, coil winding 23, guide tube 24, guide tube gasket 34, poppet 25, poppet return spring 26, poppet gasket 33, orifice seat 27, orifice 28, valve body 29, input port 30, output port 31, and lead termination 32. However, the end of poppet 25 that enters the orifice 28 preferably has a conical shape so that when it is modulated up and down into the orifice 28 it will linearly alter the flow rate. However, it should be recognized that the end of the poppet 25 that enters the orifice 28 may have any shape which enables the poppet 25 to alter the flow rate. For example, the end of the poppet 25 may have a curved, radiused, rounded, or protruding shape including, but not limited to, a cylindrical shape, a triangular shape, or a spherical shape. Also, it is preferred that the magnetic field does not become saturated if the coil winding 23 is exposed to a 100% duty cycle of the pulse width modulated signal 41. Over heating can occur if the magnetic field becomes saturated. Also, the pulse width modulated action of the poppet 25 would not be linear in operation. The magnetic field is preferably more evident in a proportional valve design to compensate for the poppet return spring 26 tension. The greater the effect of the magnetic field on the poppet, 25 the less effect the poppet return spring 26 will have on the operation and movement of the poppet 25. The position of the magnetic field in relation to the poppet 25 is very important and is relevant to the flow rate required. The magnetic field position may be determined by the relative position of a coil winding 23 to the poppet 25 or by changing the characteristics of the winding in relation to the poppet, i.e. more windings at the bottom. The angle and length of the poppet 25, the height of the orifice seat 27, and the diameter of the orifice 28 diameter are determined according to the desired flow patterns of a particular application.

Figure 5:
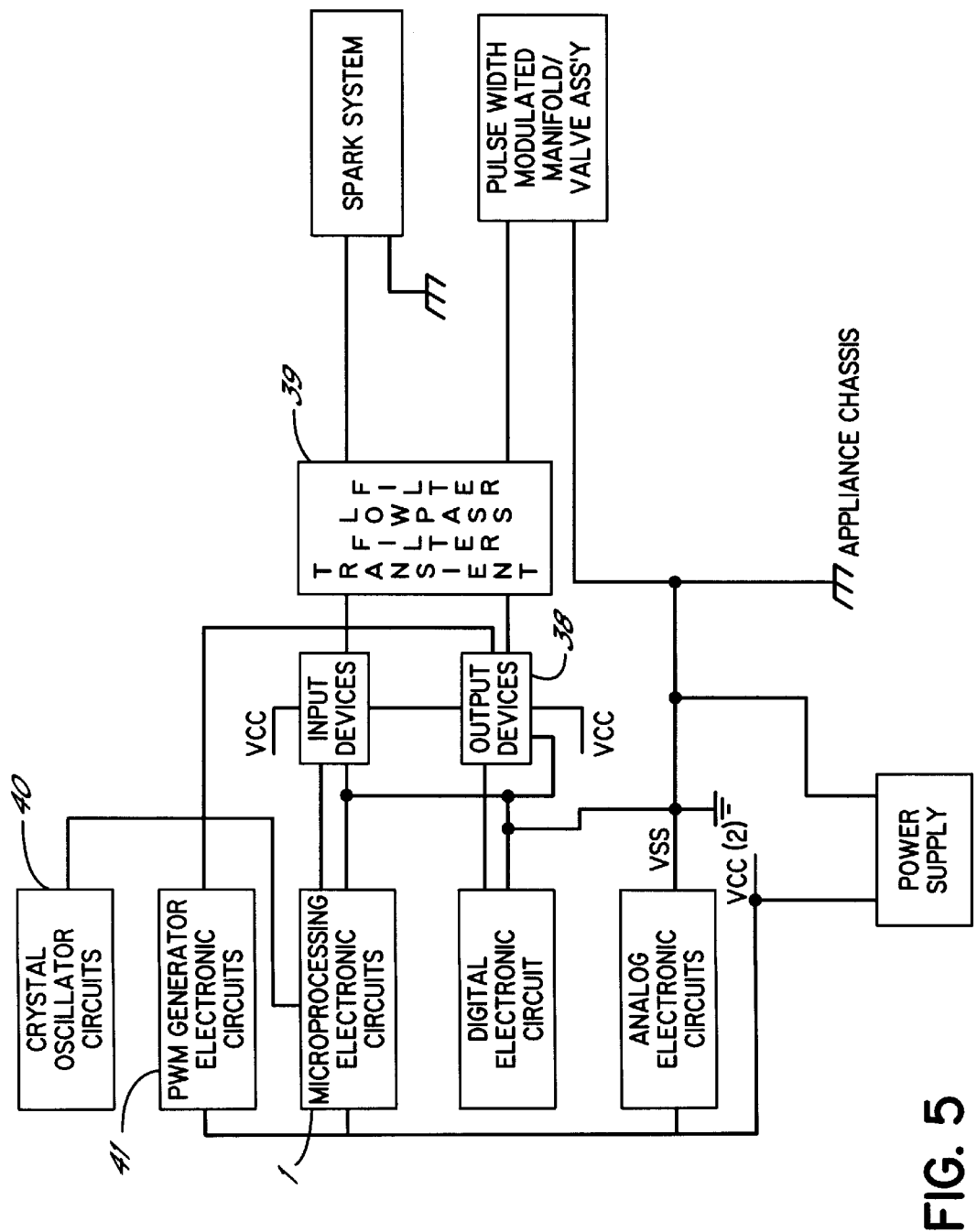
FIG. 5 is a schematic diagram of a preferred embodiment of a flow control system of the present invention.

The valve in FIG. 4 is preferably controlled by a microprocessor based circuit illustrated in FIG. 5. The microprocessor I will initiate a pulse width modulated signal when a start command is enabled. The pulse width modulated signal 41 may be applied to an output switching device 38 to switch on and off power applied to the coil winding 23 of the proportional valve. The duty cycle of the pulse width modulated signal 41 will control the amount of movement of the poppet 25 in the proportional valve and control the amount of flow in the valve by energizing the coil winding 23 to a desired level. The desired level can be obtained by changing the duty cycle of the pulse width modulated signal 41 and by determining the regulated voltage supply needed for operation. To insure a smooth and linear movement of the poppet 25, an overlapping of the magnetic field will minimize overshooting characteristics of the poppet 25 due to an in rush of power through the coil winding 23. The frequency of the pulse width modulated signal 41 should be high enough to not allow the magnetic field to collapse completely. The in rush power effect is reduced, if the magnetic field does not fully collapse. A 6 DB/octave shunt low pass filter 39 may be used on the output of the switching device 38 to prevent harmonics and spurious signals generated by the output switching device 38. These harmonics may have a negative effect on the performance of the proportional valve. The pulse width modulated signal 41 is preferably controlled with a crystal 40 to insure precise duty cycle of the pulse width modulated signal 41.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A gas appliance comprising:
   a burner adapted to burn a fuel and produce a flame;
   a conduit connected to a source of said fuel and adapted to convey said fuel to said burner;
   a pulse width modulated signal generator circuit;
   a control circuit in electrical communication with said pulse width modulated signal generator circuit, said control circuit adapted to command said pulse width modulated signal generator circuit to generate a pulse width modulated signal;
   a valve interposed on said conduit between said source of said fuel and said burner and in electrical communication with said pulse width modulated signal generator circuit, said valve adapted to be adjusted to positions between and including a fully closed position and a fully open position in response to the duty cycle of said pulse width modulated signal; and
   a switching device adapted, on demand, to switch on and off a flow of said pulse width modulated signal to said valve;
   wherein said valve substantially linearly alters the flow rate of fuel when adjusted by the duty cycle of said pulse width modulated signal.

2. The gas appliance of claim 1 wherein said valve includes:
   a poppet; and
   an orifice seat adapted to receive an end portion of said poppet, said poppet adapted to move relative to said orifice seat in response to a change in said pulse width modulated signal;
   wherein the position of said poppet relative to said orifice seat determines the amount of said fuel conveyed to said burner.

3. The gas appliance of claim 2 wherein said poppet moves linearly in response to changes in said pulse width modulated signal.

4. The gas appliance of claim 2 wherein said end portion of said poppet is conical.

5. The gas appliance of claim 1 further comprising a filter in electrical communication with said switching device and said valve, said filter adapted to suppress noise generated by said switching device.

6. The gas appliance of claim 1 wherein:
   said control circuit is in electrical communication with an input device, said input device adapted to provide an input command to said control circuit; and
   said control circuit is adapted to command said pulse width modulated signal generator circuit to change said pulse width modulated signal based on a change in said input command.

7. The gas appliance of claim 1 wherein said control circuit is a microprocessor-based or microcontroller-based electronic circuit.

8. A gas appliance comprising:
   a burner adapted to burn a fuel and produce a flame;
   a conduit connected to a source of said fuel and adapted to convey said fuel to said burner;
   a pulse width modulated signal generator circuit;
   a control circuit in electrical communication with said pulse width modulated signal generator circuit, said control circuit adapted to command said pulse width modulated signal generator circuit to generate a pulse width modulated signal;
   a valve interposed on said conduit between said source of said fuel and said burner and in electrical communication with said pulse width modulated signal generator circuit; and
   a switching device adapted, on demand, to switch on and off a flow of said pulse width modulated signal to said valve;
   wherein said valve provides a substantially linear flow rate of fuel to said burner in response to said pulse width modulated signal.

9. The gas appliance of claim 8 further comprising a filter in electrical communication with said switching device and said valve, said filter adapted to suppress noise generated by said switching device.

10. A gas appliance comprising:
 a burner adapted to burn a fuel and produce a flame;
 a conduit connected to a source of said fuel and adapted to convey said fuel to said burner;
 a pulse width modulated signal generator circuit;
 a control circuit in electrical communication with said pulse width modulated signal generator circuit, said control circuit adapted to command said pulse width modulated signal generator circuit to generate a pulse width modulated signal;
 a valve interposed on said conduit between said source of said fuel and said burner and in electrical communication with said pulse width modulated signal generator circuit, said valve adapted to be adjusted to positions between and including a fully closed position and a fully open position in response to the duty cycle of said pulse width modulated signal; and
 a switching device adapted, on demand, to switch on and off a flow of said pulse width modulated signal to said valve.

11. The gas appliance of claim 10 wherein said valve includes:
 a poppet; and
 an orifice seat adapted to receive an end portion of said poppet, said poppet adapted to move relative to said orifice seat in response to a change in the duty cycle of said pulse width modulated signal;
 wherein the position of said poppet relative to said orifice seat determines the amount of said fuel conveyed to said burner.

12. The gas appliance of claim 11 wherein said poppet moves linearly in response to changes in the duty cycle of said pulse width modulated signal.

13. The gas appliance of claim 11 wherein said end portion of said poppet is conical.

14. The gas appliance of claim 10 further comprising a filter in electrical communication with said switching device and said valve, said filter adapted to suppress noise generated by said switching device.

15. The gas appliance of claim 10 wherein:
 said control circuit is in electrical communication with an input device, said input device adapted to provide an input command to said control circuit; and
 said control circuit is adapted to command said pulse width modulated signal generator circuit to change said pulse width modulated signal based on a change in said input command.

16. The gas appliance of claim 10 wherein said control circuit is a microprocessor-based or microcontroller-based electronic circuit.

* * * * *